(12) United States Patent
Hashimoto (10) Patent No.: US 10,284,058 B2
(45) Date of Patent: May 7, 2019

(54) METHOD AND APPARATUS FOR MANUFACTURING LAMINATED CORES

(71) Applicant: Mitsui High-tec, Inc., Kitakyushu-shi, Fukuoka (JP)

(72) Inventor: Akihiro Hashimoto, Kitakyushu (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 237 days.

(21) Appl. No.: 14/863,736

(22) Filed: Sep. 24, 2015

(65) Prior Publication Data
US 2016/0094111 A1 Mar. 31, 2016

(30) Foreign Application Priority Data

Sep. 25, 2014 (JP) .................................. 2014-194697
Aug. 20, 2015 (JP) .................................. 2015-162963

(51) Int. Cl.
*H02K 15/02* (2006.01)

(52) U.S. Cl.
CPC .................................. *H02K 15/02* (2013.01)

(58) Field of Classification Search
CPC .... B21D 28/02; H02K 15/022; H02K 15/024; H02K 15/02; B23P 21/004; Y10T 29/5138; Y10T 29/53161
See application file for complete search history.

(56) References Cited

U.S. PATENT DOCUMENTS

| 4,993,290 A * | 2/1991 | Obradovic | H02K 1/22 29/416 |
| 5,265,320 A * | 11/1993 | Greenway | B21D 28/22 29/596 |
| 5,636,432 A * | 6/1997 | Usher | H02K 1/165 29/596 |
| 7,626,306 B2 * | 12/2009 | Sato | H02K 1/146 310/216.055 |
| 8,286,331 B2 * | 10/2012 | Hashimoto | H02K 1/146 29/564.1 |
| 2009/0025203 A1 * | 1/2009 | Tanaka | B21D 28/22 29/596 |
| 2011/0232076 A1 | 9/2011 | Matsubara et al. | |
| 2016/0094111 A1 * | 3/2016 | Hashimoto | H02K 15/02 29/598 |

FOREIGN PATENT DOCUMENTS

| CN | 201066803 Y | 5/2008 |
| CN | 102714449 A | 10/2012 |
| JP | 6-269149 A | 9/1994 |
| JP | 10-004656 A | 1/1998 |
| JP | 2003-19521 A | 1/2003 |
| JP | 2011-239678 A | 11/2011 |

\* cited by examiner

*Primary Examiner* — Minh Trinh
(74) *Attorney, Agent, or Firm* — Westerman, Hattori, Daniels & Adrian, LLP (57) ABSTRACT

At the time of manufacturing both a laminated rotor core 13 and a laminated stator core 14 by punching out a plurality of iron core pieces 11 and 12 from a same strip material 10 and laminating the punched out iron core pieces 11 and 12, respectively, a plurality of kinds of laminated rotor cores 13 and 13a are manufactured by further punching out a plurality of iron core pieces 11a from the strip material 10 and laminating the punched out iron core pieces 11a. Here, the plurality of kinds of the laminated rotor cores 13 and 13a can be used for different electric motors.

7 Claims, 8 Drawing Sheets

METHOD AND APPARATUS FOR MANUFACTURING LAMINATED CORES

TECHNICAL FIELD

The present invention relates to a method and apparatus for manufacturing laminated cores by and with which both a laminated rotor core and a laminated stator core can be manufactured from a same strip material.

BACKGROUND ART

In view of material yield, there is a method to manufacture both a laminated rotor core and a laminated stator core by punching out a plurality of iron core pieces from a same strip material and laminating them. For example, in Patent Literature 1, there is disclosed a method for manufacturing laminated cores for a stepping motor in which rotor core pieces and stator core pieces are sequentially punched out from a same strip material.

CITATION LIST

Patent Literature

Patent Literature 1: Japanese Unexamined Patent Application Publication No. H06-269149

SUMMARY OF INVENTION

Technical Problem

Normally, laminated rotor cores and laminated stator cores have the same lamination height (lamination thickness, numbers of iron core pieces laminated), however, depending on products, laminated rotor cores and laminated stator cores have different lamination heights in some cases. Besides this, in the case of hybrid-type stepping motors, a laminated rotor core in which a permanent magnet is held in between two laminated cores formed by laminating a plurality of iron core pieces is used, which sometimes requires a laminated rotor core having a lamination height that is shorter than that of a laminated stator core.
In these cases, even if an improvement in material yield is attempted by manufacturing both a laminated rotor core and a laminated stator core from a same strip material as described earlier, a punch-out area for punching out iron core pieces for formation of a laminated rotor core has a surplus, and material yield lowers. Also, even if iron core pieces are punched out from the surplus punch-out area, laminated, and stored as stock, if there is no opportunity to use them, the stored iron core pieces will be disposed without any use, which consequently lowers the material yield.

The present invention has been made in view of the above circumstances, and an object thereof is to provide a method and apparatus for manufacturing laminated cores that are capable of improving material yield at the time of manufacturing both a laminated rotor core and a laminated stator core from a same strip material.

Solution to Problem

In order to achieve the above object, according to a method for manufacturing laminated cores of the present invention, in the method for manufacturing laminated cores in which a plurality of iron core pieces are punched out from a same strip material and laminated to manufacture both a laminated rotor core and a laminated stator core, a plurality of kinds of the laminated rotor cores can be manufactured from the strip material.

In the case of the method for manufacturing laminated cores according to the present invention, the plurality of kinds of the laminated rotor cores can also be used for different electric motors.

In the case of the method for manufacturing laminated cores according to the present invention, the plurality of kinds of the laminated rotor cores can also be in different shapes.

In the case of the method for manufacturing laminated cores according to the present invention, the plurality of kinds of the laminated rotor cores can also be manufactured by laminating different numbers of the iron core pieces having a same shape.

In order to achieve the above object, according to an apparatus for manufacturing laminated cores of the present invention, in the apparatus for manufacturing laminated cores in which a plurality of iron core pieces are punched out from a same strip material and laminated to manufacture both a laminated rotor core and a laminated stator core, rotor core lamination dies that form the laminated rotor cores by punches in a same mold apparatus are provided in plurality.

In the case of the apparatus for manufacturing laminated cores according to the present invention, the plurality of the rotor core lamination dies each can also be index-rotated through rotating mechanisms for rotational lamination and by means of a single rotary drive source.

In the case of the apparatus for manufacturing laminated cores according to the present invention, the mold apparatus also has a stator core lamination die that forms the laminated stator core by a punch, and by means of the rotary drive source, the stator core lamination die can also be index-rotated in concert with the rotor core lamination dies.

Advantageous Effects of Invention

In the case of the method and apparatus for manufacturing laminated cores according to the present invention, since a plurality of kinds of laminated rotor cores are manufactured at the time of manufacturing both laminated rotor cores and a laminated stator core from a same strip material, an area having been a surplus when manufacturing only a single kind of laminated rotor core can be used for the manufacture of other laminated rotor cores. Therefore, material yield can be improved.

Also, in the case of the apparatus for manufacturing laminated cores, when intermittently rotating the plurality of the rotor core lamination dies and even the stator core lamination die by means of a single rotating mechanism for rotational lamination, miniaturization of the apparatus becomes increasingly possible.

DESCRIPTION OF EMBODIMENTS

Figure 5:
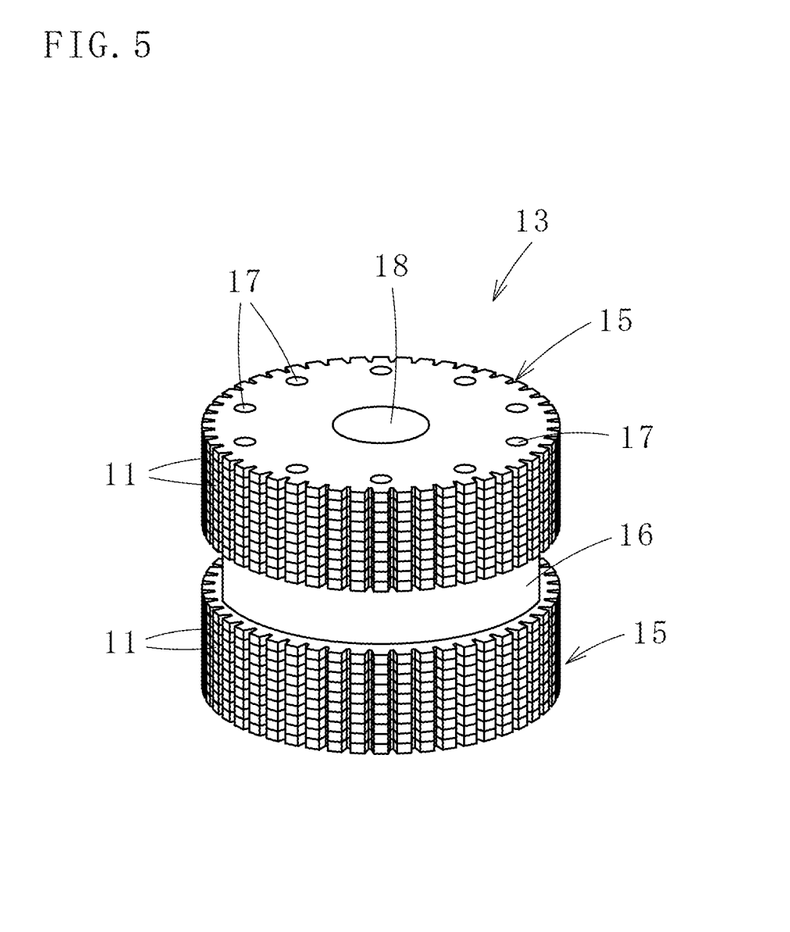
FIG. 5 is a perspective view of a laminated rotor core manufactured using the same method for manufacturing laminated cores.
Figure 6:
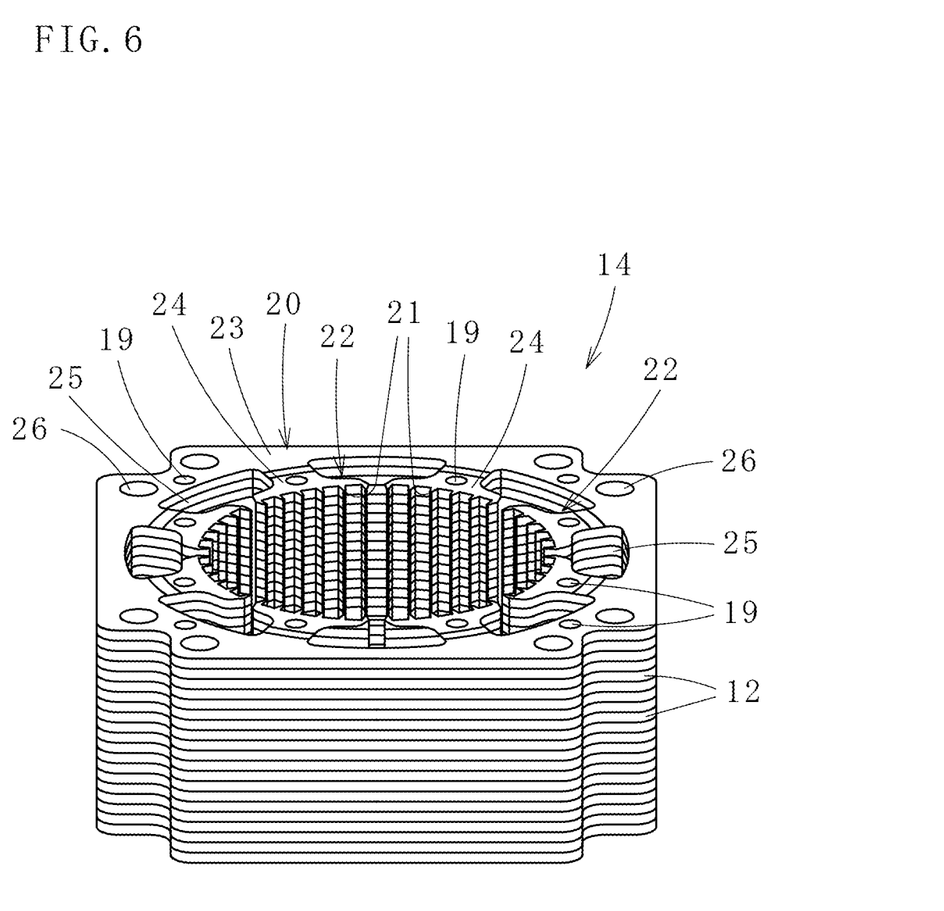
FIG. 6 is a perspective view of a laminated stator core manufactured using the same method for manufacturing laminated cores.

Next, with reference to the accompanying drawings, descriptions will be given on embodiments of the present invention for a better understanding of the present invention. As illustrated in FIGS. 1 to 4, in the case of a method for manufacturing laminated cores according to one embodiment of the present invention, a plurality of iron core pieces 11 and 12 each are punched out from a same strip material 10 and laminated, and as illustrated in FIGS. 5 and 6, when manufacturing both a laminated rotor core (a rotor) 13 and a laminated stator core (a stator) 14, a plurality of additional iron core pieces 11a are further punched out from the strip material 10 and laminated to manufacture a plurality of kinds of laminated rotor cores 13 and 13a. Detailed descriptions will be given below.

The laminated rotor cores 13 and 13a and the laminated stator core 14 are ones for use in hybrid-type stepping motors (an example of electric motors).

Here, between the plurality of kinds (here, it is two kinds) of the laminated rotor cores 13 and 13a to be manufactured from the same strip material 10, one of the laminated rotor cores 13 is for use with the laminated stator core 14. Lamination heights (lamination thicknesses, numbers of iron core pieces to be laminated) of these laminated rotor core 13 and laminated stator core 14 are different from each other, and the laminated rotor core 13 is shorter (thinner) than the laminated stator core 14. With regard to laminated rotor cores and laminated stator cores, as long as the lamination height of a laminated rotor core is shorter than that of a laminated stator core, the laminated rotor core and the laminated stator core do not have to be limited to be used for the above-mentioned hybrid-type stepping motors, and can also be used for other electric motors.

Moreover, the other one of the laminated rotor cores 13a is for use with other laminated stator cores.

This other one of the laminated rotor cores 13a can be used together with other laminated stator cores as is without increasing the number of iron core pieces to be laminated or in a state of having increased numbers of iron core pieces laminated. The laminated rotor core 13a can also be used for electric motors other than the hybrid-type stepping motors. Here, the plurality of kinds of laminated rotor cores 13 and 13a to be manufactured from the same strip material 10 can be used for electric motors of a same kind, and can also be used for electric motors of different kinds. The laminated rotor cores 13 and 13a can also have different shapes (structures) from each other. Here, the term, different shapes, refers to, for example, a case where the shapes of iron core pieces or layouts of caulkings and the like differ, a case where the shapes of the iron core pieces are the same, but the numbers of iron core pieces to be laminated are different, etc., depending on specifications of electric motors to be used.

As illustrated in FIG. 5, the above laminated rotor core 13 has two laminated cores 15 formed by laminating a plurality of iron core pieces 11, and a permanent magnet 16 to be held in between the two laminated cores 15. Each layer of the annular iron core pieces 11 forming the laminated rotor core 13 has an integrated structure that is not provided with connecting portions in a circumferential direction, however, each layer of the annular iron core pieces 11 can alternatively have a divided structure in which arc-like parts for iron core pieces can be connected with one other in an annular manner (the same applies to the iron core pieces 11a forming the laminated rotor core 13a).

The iron core pieces 11 adjacent to one another in a lamination direction are joined to one another using caulking portions 17. However, these iron core pieces 11 can also be joined using welding or resin, or by a combination of two or more of these (the same applies to the iron core pieces 11a). Additionally, a shaft hole 18 is formed in the center of the laminated rotor core 13 (the same applies to the laminated rotor core 13a).

As illustrated in FIG. 6, the laminated stator core 14 is formed by laminating a plurality of the iron core pieces 12. Each layer of the annular iron core pieces 12 forming the laminated stator core 14 has an integrated structure that is not provided with connecting portions in a circumferential direction, however, each layer of these iron core pieces 12 can have a divided structure in which arc-like parts for iron core pieces can be connected with one other in an annular manner.

The iron core pieces 12 adjacent to one another in a lamination direction are joined to one another using caulking portions 19, however, these iron core pieces 12 can also be joined using welding or resin, or by a combination of two or more of these.

The laminated stator core 14 has an annular yoke portion 20, and magnetic pole portions 22 integrally connected to the inside of this yoke portion 20 and having a plurality of toothlets (slits) 21 formed at the tip portions.

These yoke portion 20 and magnetic pole portions 22 each are formed by laminating the iron core pieces 12 each having a yoke piece portion 23 and magnetic pole piece portions 24. These magnetic pole piece portions 24 are formed by punching out slots 25 with respect to the strip material 10. A numeral 26 represents bolt holes that attach and fix the laminated stator core 14.

The plurality of kinds of the laminated rotor cores 13 and 13a and the laminated stator core 14 described above are manufactured from the same strip material 10 in an order shown in FIGS. 1 to 4.

Figure 1:
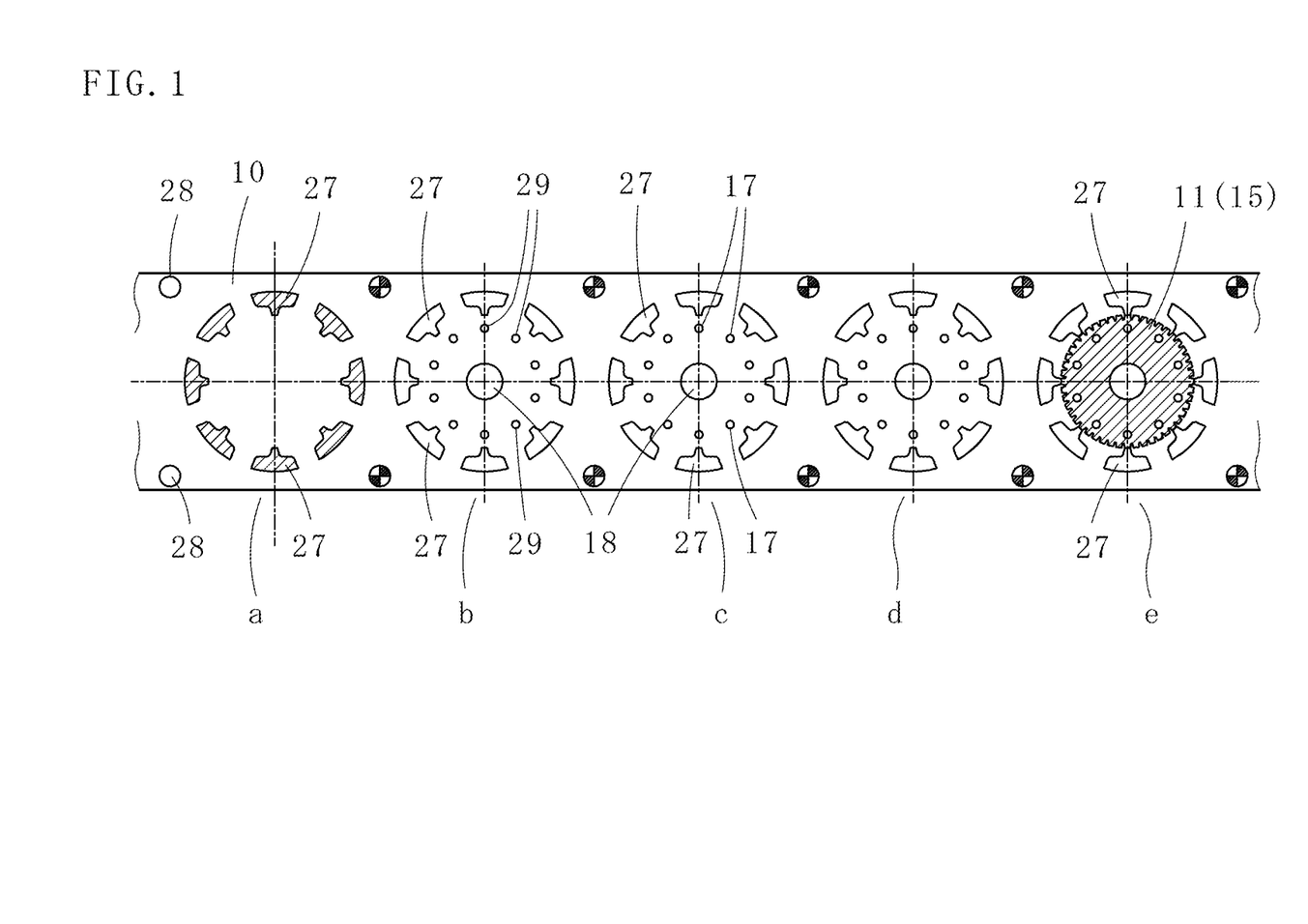
FIG. 1 is an explanatory diagram of a method for manufacturing laminated cores according to one embodiment of the present invention.
Figure 2:
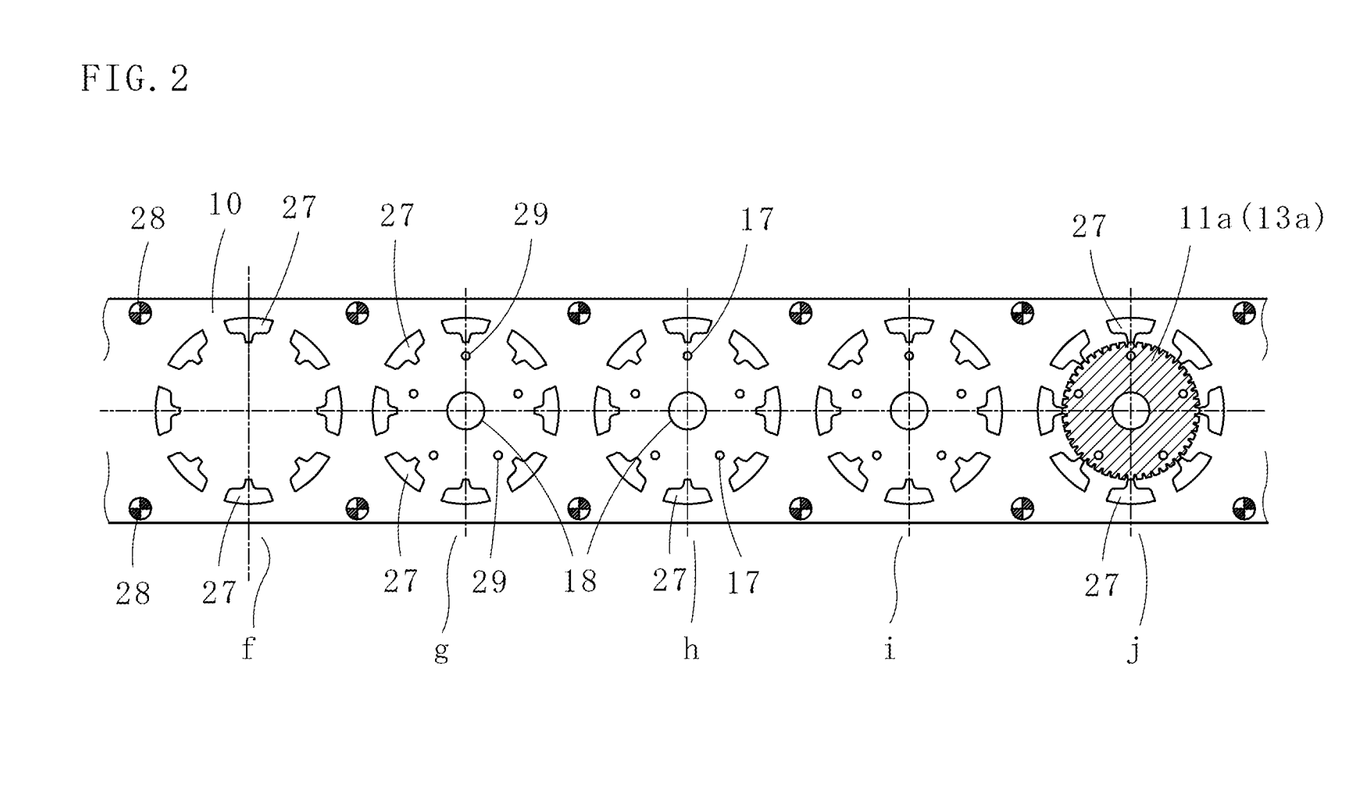
FIG. 2 is an explanatory diagram of the same method for manufacturing laminated cores.

First, descriptions will be given on a step for manufacturing the laminated rotor cores 13 and 13a with reference to FIGS. 1 and 2. Each of steps a to e in FIG. 1 is a step for manufacturing one of the laminated rotor cores 13 to be used with the earlier-described laminated stator core 14, and each of steps f to j in FIG. 2 is a step for manufacturing the other one of the laminated rotor cores 13a to be used with the earlier-described other laminated stator cores. Since the steps a to e and the steps f to j are similar to each other, same components will be represented by same numerals. Since the step a for punching out temporary slots illustrated in FIG. 1 and the step f for punching out temporary slots illustrated in FIG. 2 are the same, the step f for punching out temporary slots in FIG. 2 may be omitted, and the step a for punching out temporary slots in FIG. 1 may be used instead. In this case, the step f for punching out temporary slots will be an idle step.

As illustrated in FIG. 1, temporary slots 27 are punched out from a strip material 10 of an electromagnetic steel sheet having a thickness of, for example, approximately 0.15 to 0.5 mm (the step a for punching out temporary slots). Here, pilot holes 28 for positioning are formed on both sides in a width direction of the strip material 10 at a predetermined pitch.

Next, with respect to an area for punching out one of iron core pieces 11 which is the first to be laminated, caulking holes (through-holes) 29 in which caulking portions 17 are to be fitted are formed instead of forming the caulking portions 17 (a step b for forming caulking holes), and with respect to an area for punching out iron core pieces 11 which are the second and following to be laminated, the caulking portions 17 will be formed (a step c for forming caulking portions). Here, a shaft hole 18 is also punched out in either of the steps b or c.

Then, after going through an idle step (a step d in which punching-out is not performed), the iron core pieces 11 are punched out (a step e for punching out iron core pieces). The laminated rotor core 13 (i.e., two laminated cores 15) is manufactured by sequentially laminating a plurality of the iron core pieces 11 punched out in the above steps a to e. Punching-out of the iron core pieces 11 necessary for the manufacture of the laminated rotor core 13 is then finished. With respect to the strip material 10 finished with the punching-out of the iron core pieces 11, steps for manufacturing the laminated stator core 14 (punching-out of iron core pieces 12) illustrated in FIGS. 3 and 4 to be mentioned afterwards are performed. However, as described earlier, since the lamination height of the laminated rotor core 13 is shorter than that of the laminated stator core 14, a punch-out area for the iron core pieces 11 will have a surplus.

Accordingly, with respect to the strip material 10 finished with the step a for punching out temporary slots in FIG. 1, manufacturing steps g to j in FIG. 2 are performed without performing the above-described punching-out of the iron core pieces 11 in the other steps b to e in FIG. 1, and then the iron core pieces 11a to be used for the manufacture of the other one of the laminated rotor cores 13a are punched out. Here, as illustrated in FIG. 2, after initially going through the idle step f and forming the above caulking holes 29 (a step g for forming caulking holes) or caulking portions 17 (a step h for forming caulking portions), and after going through an idle step i, the iron core pieces 11a are punched out (a step j for punching out iron core pieces). A layout of the caulking holes 29 and caulking portion 17 in the iron core pieces 11a is different from the layout of the caulking holes 29 and caulking portions 17 in the iron core pieces 11.

Then, by sequentially laminating the plurality of the punched out iron core pieces 11a, the other one of the laminated rotor cores 13a can be manufactured.

Figure 3:
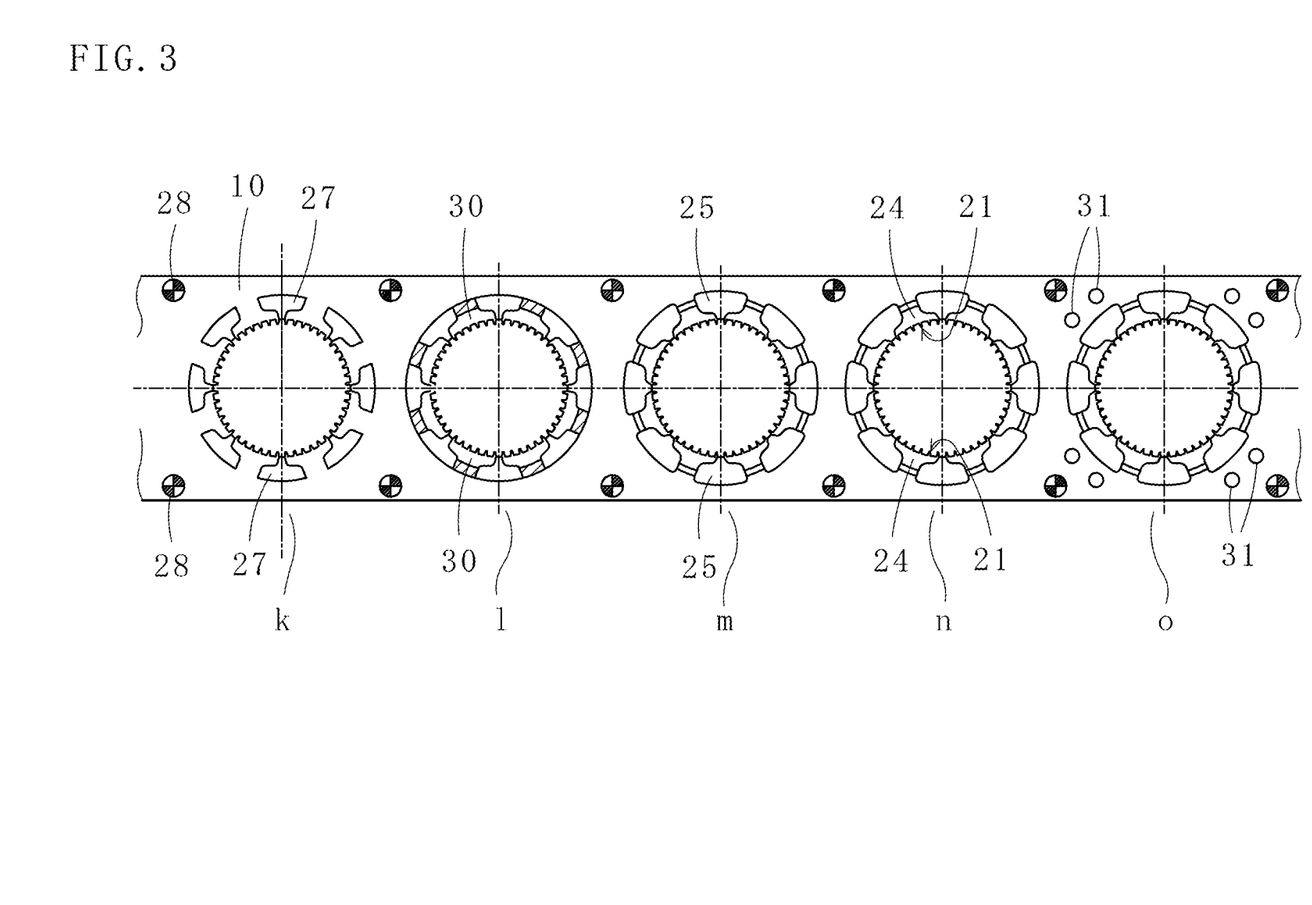
FIG. 3 is an explanatory diagram of the same method for manufacturing laminated cores.
Figure 4:
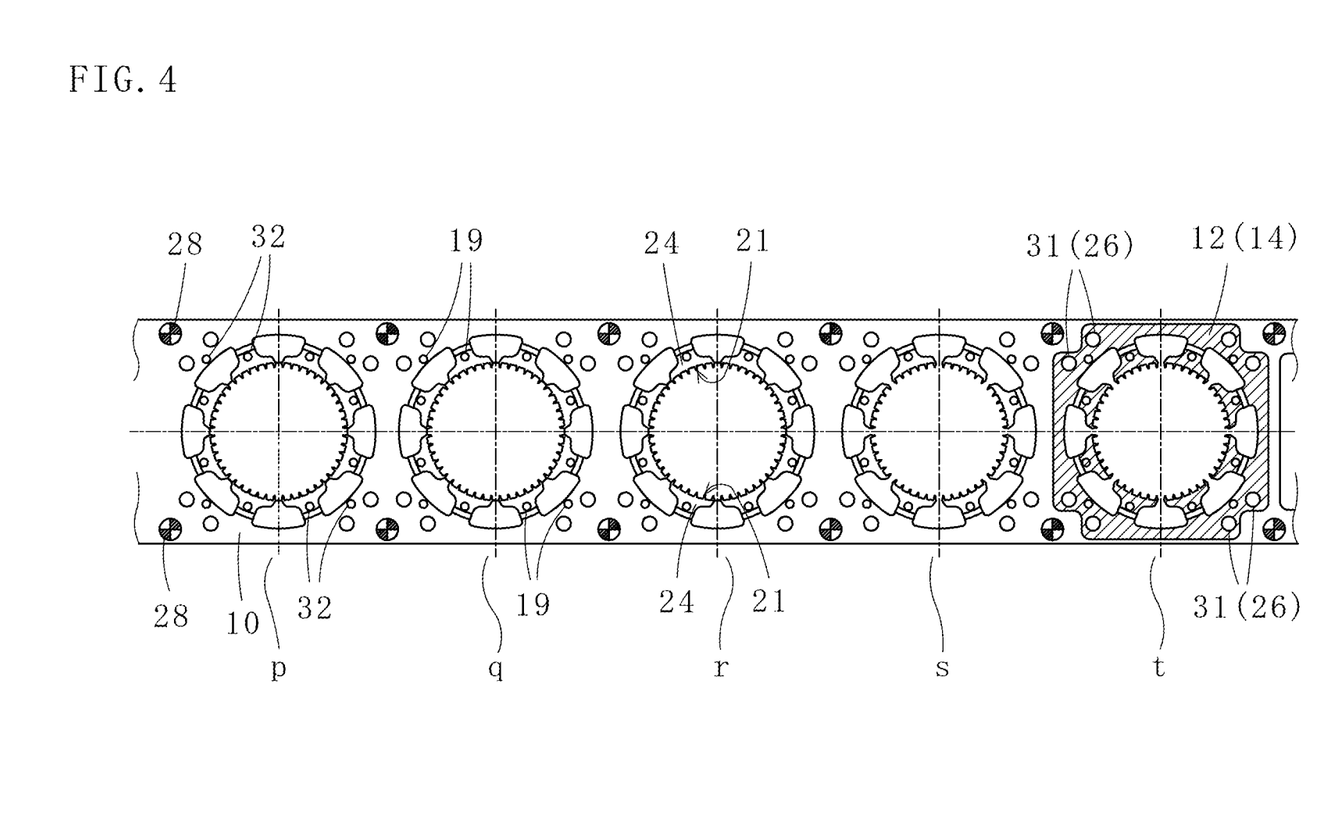
FIG. 4 is an explanatory diagram of the same method for manufacturing laminated cores.

Since the punching-out of the iron core pieces 11a necessary for the manufacture of the other one of the laminated rotor cores 13a is thereby finished, with respect to the strip material 10 finished with the punching-out of these iron core pieces 11a, steps k to t for manufacturing the laminated stator core 14 shown in FIGS. 3 and 4 are subsequently performed, and the iron core pieces 12 are punched out.

The above punching-out of the temporary slots 27, forming of the caulking holes 29, forming of the caulking portions 17, and punching-out of the iron core pieces 11 and 11a each are performed in a single mold apparatus (not illustrated). Switch-over between the manufacturing steps in FIG. 1 excluding the step for punching out temporary slots and the manufacturing steps in FIG. 2 (operation and rest of a mold) is performed either manually or automatically.

In FIGS. 1 and 2, the descriptions have been given on the cases where the iron core pieces 11 and 11a in different shapes are punched out. However, as described earlier, iron core pieces in a same shape can also be punched out depending on, for example, a specification of an electric motor to be used. In this case, by changing the number of iron core pieces to be laminated, a laminated rotor core of a different kind than the laminated rotor core 13 can be manufactured.

In this case, since the forming of the caulking holes and caulking portions illustrated in FIG. 2 will be a same layout as that of FIG. 1, after forming the caulking holes and caulking portions illustrated in FIG. 1, the iron core pieces illustrated in FIG. 2 can also be punched out without forming (omitting) the caulking holes and caulking portions illustrated in FIG. 2.

Next, the laminated stator core 14 is manufactured from the strip material 10 having gone through the above manufacturing steps in FIG. 1 or the above manufacturing steps in FIG. 2. Descriptions will be given hereunder on steps for manufacturing the laminated stator core 14 with reference to FIGS. 3 and 4.

First, as illustrated in FIG. 3, after going through an idle step k, basal part of each of temporary magnetic pole piece portions 30 is subjected to coining (a step l for coining). The temporary magnetic pole piece portions 30 can thereby be extended toward the side of an axial center of the iron core pieces 12. This step is omissible if not necessary.

Then, an outer circumferential surface of each of the temporary slots 27 is subjected to finish machining to form the slots 25 (a step m for completing slots).

A tip of each of the temporary magnetic pole piece portions 30 is subsequently punched, and the magnetic pole piece portions 24 each having the plurality of toothlets 21 formed at the tip portion are formed (a step n for forming toothlets). Through-holes 31 composing the bolt holes 26 are formed at four corners of a punch-out area for the iron core pieces 12 (a step o for forming bolt holes).

Next, as illustrated in FIG. 4, with respect to an area from which one of the iron core pieces 12 that is the first to be laminated is punched out, instead of forming the caulking portions 19, caulking holes (through-holes) 32 in which the caulking portions 19 are to be fitted are formed (a step p for forming caulking holes), and with respect to areas from which the iron core pieces 12 that are the second and following to be laminated are punched out, the caulking portions 19 are formed (a step q for forming caulking portions).

After performing internal diameter punching (shaving-machining) with respect to inner circumferential surfaces after the iron core pieces 11 or iron core pieces 11a have been punched out (a step r for punching out internal diameters), and after going through an idle step s, the iron core pieces 12 are punched out (a step t for punching out iron core pieces).

By sequentially laminating a plurality of these punched out iron core pieces 12, the laminated stator core 14 can be manufactured.

As seen from the above, by using the method for manufacturing laminated cores of this embodiment, a surplus area can be rid at the time of manufacturing both the laminated rotor core 13 and the laminated stator core 14 from the same strip material 10, enabling an improvement in the material yield.

Next, with reference to FIG. 7, descriptions will be given on an apparatus for manufacturing laminated cores 35 according to a first embodiment of the present invention.

This manufacturing apparatus 35 has, in a single mold apparatus, stations A to D where the step a for punching out temporary slots, the step b for forming caulking holes, the step c for forming caulking portions, and an idle step d are performed, and a station E where the iron core pieces 11 are punched out, which are as illustrated in FIG. 1, stations F to I where the idle step f, the step g for forming caulking holes, the step h for forming caulking portions, and the idle step i are performed, and a station J where the iron core pieces 11a are punched out, which are as illustrated in FIG. 2, and stations K to S where the idle step k, the step l for coining, the step m for completing slots, the step n for forming toothlets, the step o for forming bolt holes, the step p for forming caulking holes, the step q for forming caulking portions, the step r for punching out internal diameters, and the idle step s are performed, and a station T where the (stator) iron core pieces 12 are punched out and laminated, which are as illustrated in FIGS. 3 and 4. Here, the station E is provided with a rotor core lamination die that forms the laminated rotor core 13 by a punch, the station J is provided with a rotor core lamination die that forms the laminated rotor core 13a by a punch, and the station T is provided with a stator core lamination die that forms the laminated stator core 14 by a punch.

With regard to the iron core pieces 11, 11a, and 12, rotational lamination in which dies are rotated by a predetermined angle (normally, 180 degrees or 90 degrees) in each one of the iron core pieces or every plural number of the iron core pieces is performed to achieve homogenization of the laminated cores. Therefore, each of the stations E, J, and T is provided with one of rotating mechanisms for rotational lamination 37 to 39 rotating (index-rotating) the lamination dies by a predetermined angle. Each of the rotating mechanisms for rotational lamination 37 to 39 had one rotary drive source in the past, which has caused a problem of complication of features and control.

Figure 7:
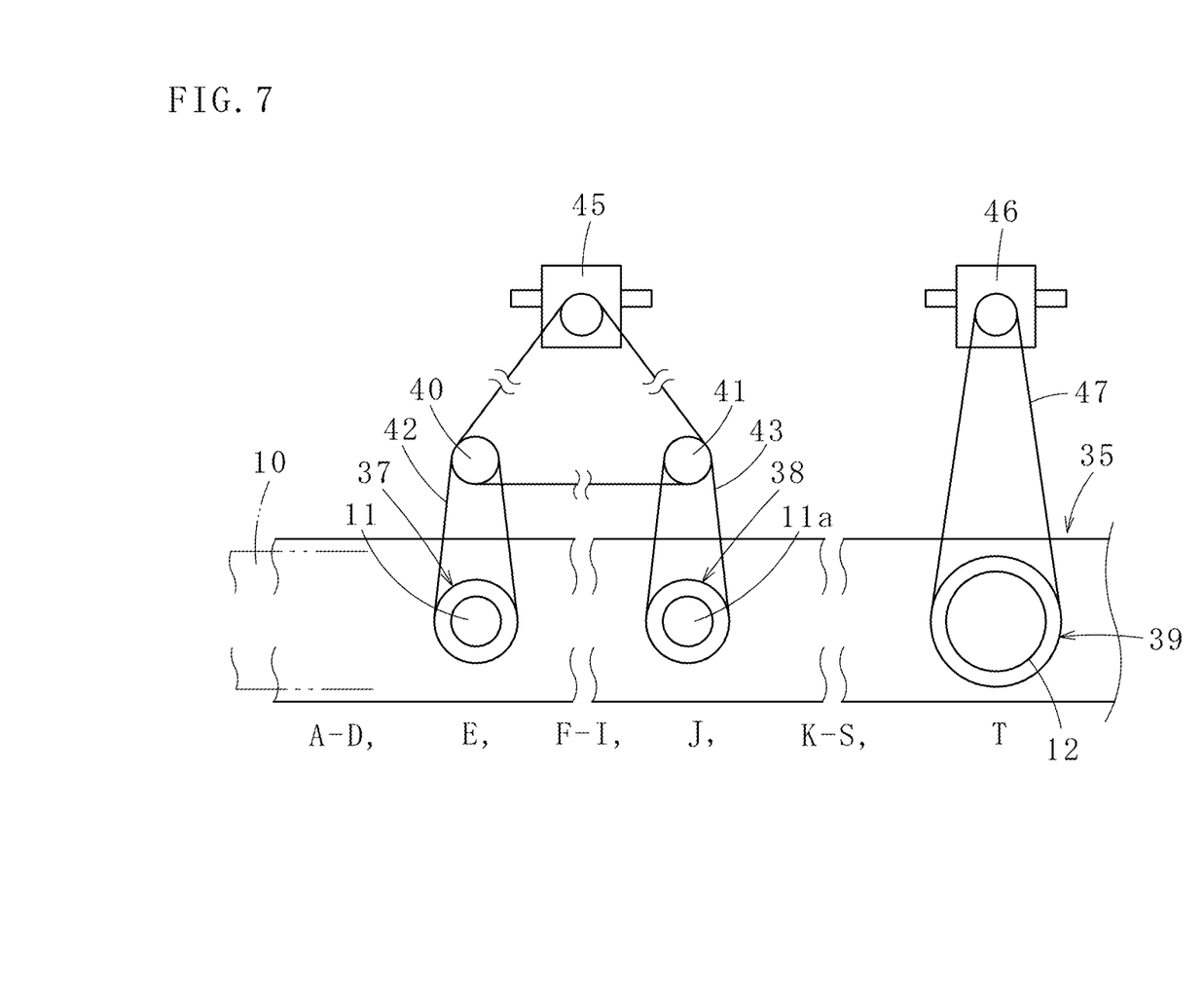
FIG. 7 is a schematic plan view of an apparatus for manufacturing laminated cores according to a first embodiment of the present invention.

In this embodiment, as illustrated in FIG. 7, power is transmitted to the rotating mechanism for rotational lamination 37 of the station E from an intermediate pulley (a toothed pulley, the same applies hereunder) 40 through a belt (a toothed belt, the same applies hereunder) 42, and power is transmitted to the rotating mechanism for rotational lamination 38 of the station J from an intermediate pulley (a toothed pulley, the same applies hereunder) 41 through a belt (a toothed belt, the same applies hereunder) 43. The intermediate pulleys 40 and 41 obtain power for intermittent rotation from a rotary drive source 45. The rotating mechanism for rotational lamination 39 of the station T obtains power for intermittent rotation from a different rotary drive source 46 through a belt 47.

Synchronized motion of the rotating mechanisms for rotational lamination 37 and 38 can thereby be made easy, and a structure of the apparatus can also be simplified.

Figure 8:
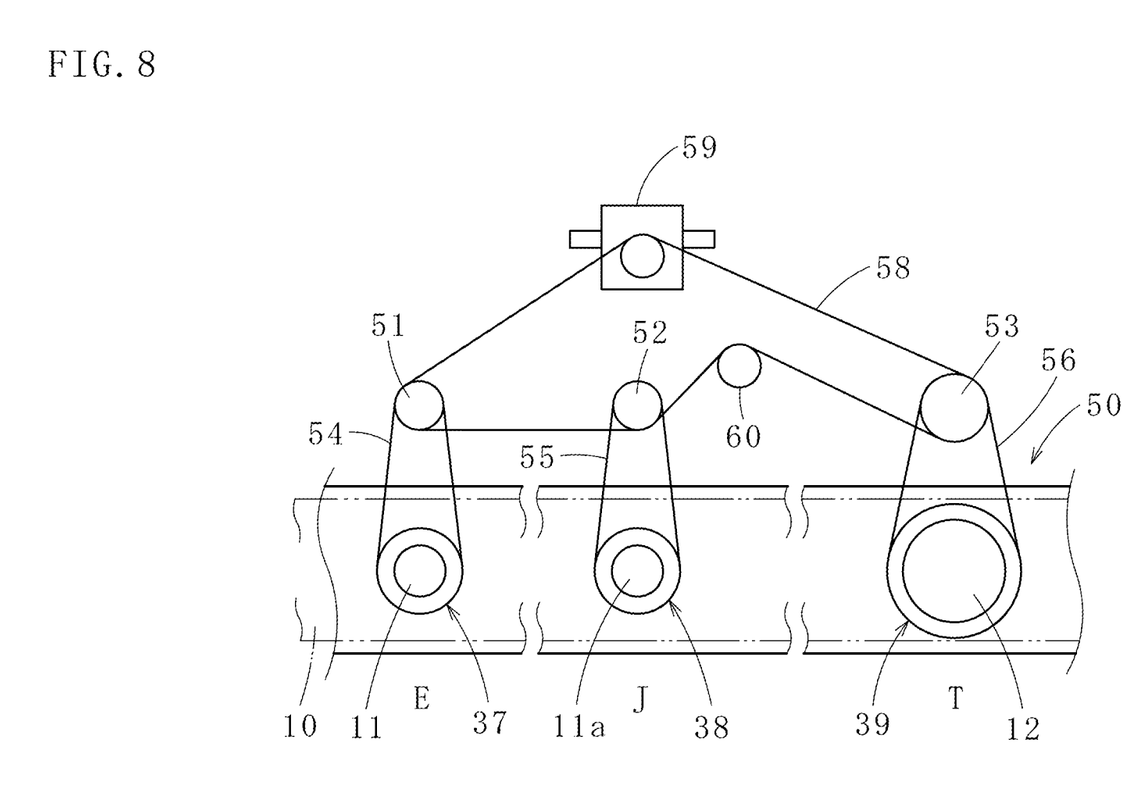
FIG. 8 is a schematic plan view of an apparatus for manufacturing laminated cores according to a second embodiment of the present invention.

Next, descriptions will be given on an apparatus for manufacturing laminated cores 50 according to a second embodiment of the present invention illustrated in FIG. 8. Since stations A to D, F to I, K to S in FIG. 8 are the same as those in FIG. 7, they are omitted in FIG. 8. This apparatus for manufacturing laminated cores 50 also has rotating mechanisms for rotational lamination 37 to 39 that punch down iron core pieces 11, 11a, and 12 inside lamination dies and rotationally laminate the iron core pieces 11, 11a, and 12. The rotating mechanisms for rotational lamination 37 to 39 are connected to intermediate pulleys 51 to 53 through belts 54 to 56, respectively, in a manner capable of being rotationally driven. The intermediate pulleys 51 to 53 are connected to a single rotary drive source 59 through a main belt 58. A numeral 60 represents a tension pulley.

Consequently, when the rotary drive source 59 intermittently rotates as predetermined, the rotation is transmitted to the rotating mechanisms for rotational lamination 37 to 39 through the main belt 58, intermediate pulleys 51 to 53, and belts 54 to 56, enabling the three rotating mechanisms for rotational lamination 37 to 39 to be synchronously driven in concert with operation of a mold.

A structure of the apparatus can thereby be made simple, and synchronization of a press and the rotating mechanisms for rotational lamination 37 to 39 can be made simple as well.

The descriptions have been given hereinbefore on the present invention with reference to the embodiments, however, the present invention is not limited to the structures described in the above embodiments, and also includes other embodiments and variations conceivable within the scope of matters described in the scope of claims. For example, cases where the method and apparatus for manufacturing laminated cores of the present invention are composed by means of a combination of parts or all of each of the above embodiments and variations are also included in the scope of right of the present invention.

In the above embodiments, the descriptions have been given on the case where the method and apparatus for manufacturing laminated cores of the present invention are applied to the manufacture of an inner-rotor type laminated core in which a laminated rotor core is placed with a space in between inside a laminated stator core. However, the method and apparatus for manufacturing laminated cores of the present invention can also be applied to the manufacture of an outer-rotor type laminated core in which a laminated rotor core is placed with a space in between outside a laminated stator core.

Also, in the above embodiments, the descriptions have been given on the case where a plurality of kinds of laminated rotor cores manufactured from a same strip material each have an integrated structure having no connecting portions in a circumferential direction. However, for example, a laminated rotor core to be used together with other laminated stator cores can alternatively have a divided structure in which arc-like parts for iron core pieces are connectable in an annular manner. In this case, it is also possible to punch out all of a plurality of parts for iron core pieces that become annular by being connected to one another from a surplus area in a strip material.

In the above embodiments, the descriptions have been given on the case where two kinds of laminated rotor cores are manufactured from a same strip material, however, depending on a lamination height of iron core pieces, it is also possible to manufacture three or more kinds of laminated rotor cores. An apparatus for manufacturing laminated cores in this case sometimes requires more stations having rotating mechanisms for rotational lamination.

As caulking portions for laminated rotor cores and laminated stator cores, round-shaped or V-shaped ones can be used, however, caulking portions in other shapes are also usable.

REFERENCE SIGNS LIST

10: strip material, 11, 11a, 12: iron core piece, 13, 13a: laminated rotor core, 14: laminated stator core, 15: laminated core, 16: permanent magnet, 17: caulking portion, 18: shaft hole, 19: caulking portion, 20: yoke portion, 21: toothlet, 22: magnetic pole portion, 23: yoke piece portion, 24: magnetic pole piece portion, 25: slot, 26: bolt hole, 27: temporary slot, 28: pilot hole, 29: caulking hole, 30: temporary magnetic pole piece portion, 31: through-hole, 32: caulking hole, 35: apparatus for manufacturing laminated cores, 37, 38, 39: rotating mechanism for rotational lamination, 40, 41: intermediate pulley, 42, 43: belt, 45, 46: rotary drive source, 47: belt, 50: apparatus for manufacturing laminated cores, 51, 52, 53: intermediate pulley, 54, 55, 56: belt, 58: main belt, 59: rotary drive source, 60: tension pulley

The invention claimed is:

1. A method for manufacturing laminated cores in which a plurality of kinds of laminated rotor cores and a laminated stator core are manufactured from a same strip material, comprising steps of:
punching out iron core pieces constituting each of the laminated rotor cores from the strip material, and laminating the iron core pieces repeatedly to manufacture each of the plurality of kinds of the laminated rotor cores; and
punching out iron core pieces constituting the laminated stator core from the exact same strip material from which the iron core pieces of the plurality of kinds of the laminated rotor cores are punched out, and laminating the punched out iron core pieces to manufacture the laminated stator core,
wherein a lamination height of each of the laminated rotor cores is shorter than a lamination height of the laminated stator core in a lamination direction of the laminated rotor cores and the laminated stator core, the lamination direction being perpendicular to a circumferential direction of the laminated rotor cores and the laminated stator core, and the number of the iron core pieces stacked and laminated in the laminated rotor cores being less than the number of the iron cores pieces stacked and laminated in the laminated stator core, and
wherein one of the plurality kinds of the laminated rotor cores is used with the laminated stator core, and the other one of the laminated rotor cores is used with other laminated stator cores.

2. The method for manufacturing laminated cores according to claim 1,
wherein the plurality of kinds of the laminated rotor cores are used for different electric motors.

3. The method for manufacturing laminated cores according to claim 1,
wherein the plurality of kinds of the laminated rotor cores are in different shapes with shapes of the iron core pieces being different or numbers of iron core pieces to be laminated being different.

4. The method for manufacturing laminated cores according to claim 2,
wherein the plurality of kinds of the laminated rotor cores are in different shapes with shapes of the iron core pieces being different or numbers of iron core pieces to be laminated being different.

5. The method for manufacturing laminated cores according to claim 1,
wherein the plurality of kinds of the laminated rotor cores are manufactured by laminating different numbers of the iron core pieces having a same shape.

6. The method for manufacturing laminated cores according to claim 2,
wherein the plurality of kinds of the laminated rotor cores are manufactured by laminating different numbers of the iron core pieces having a same shape.

7. The method for manufacturing laminated cores according to claim 1, wherein two kinds of the laminated rotor cores with different lamination heights are manufactured from the same strip material and have different numbers of the iron cores pieces that are stacked and laminated in the each of the plurality of kinds of the laminated rotor cores.

* * * * *